US010705881B2

(12) United States Patent
Chen et al.

(10) Patent No.: US 10,705,881 B2
(45) Date of Patent: Jul. 7, 2020

(54) REDUCING OVERLAY NETWORK OVERHEAD ACROSS CONTAINER HOSTS

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 276 days.

(21) Appl. No.: 15/593,744

(22) Filed: May 12, 2017

(65) Prior Publication Data

US 2018/0331969 A1 Nov. 15, 2018

(51) Int. Cl.
*G06F 9/50* (2006.01)
(52) U.S. Cl.
CPC ................... *G06F 9/5083* (2013.01)
(58) Field of Classification Search
CPC .................. H04L 47/70; G06F 3/067
USPC ........................................ 709/226
See application file for complete search history.

(56) References Cited

U.S. PATENT DOCUMENTS

| 9,697,355 | B1* | 7/2017 | Park ....................... G06F 21/552 |
| 9,772,792 | B1* | 9/2017 | Wallner ................. G06F 3/0647 |
| 10,108,695 | B1* | 10/2018 | Yeturu .................. G06F 16/285 |
| 10,191,778 | B1* | 1/2019 | Yang ..................... G06F 9/5055 |
| 10,356,214 | B2* | 7/2019 | Joshi | |
| 2015/0326449 | A1* | 11/2015 | Melander ............. H04L 41/5054 709/226 |
| 2016/0380909 | A1 | 12/2016 | Antony et al. |
| 2017/0199770 | A1* | 7/2017 | Peteva .................. G06F 9/5088 |
| 2018/0027080 | A1* | 1/2018 | Yang ...................... H04L 41/12 709/224 |

FOREIGN PATENT DOCUMENTS

WO 2016/003489 A1 1/2016

OTHER PUBLICATIONS

Cisco Virtualized Multi-Tenant Data Center Design Guide Version 2.2, copyright 2017 Cisco (34 pages) Link: http://www.cisco.com/c/en/us/td/docs/solutions/Enterprise/Data_Center/VMDC/2-2/design_guide/vmdcDesign22/VMDC_2-2_DG_2.html.

(Continued)

*Primary Examiner* — Minh Chau Nguyen
(74) *Attorney, Agent, or Firm* — K&L Gates LLP (57) ABSTRACT

A system for reducing overlay network overhead includes a memory, a processor in communication with the memory, a first container and a second container running on a first host, and a container scheduler executing on the processor. Each of the first container and second container expose a network service port(s). The container scheduler executes on the processor to assign a network complexity weight to the first host. The network complexity weight is based on a quantity of network service ports that the first container and the second container expose. The container scheduler also filters hosts based on resource availability corresponding to each host and ranks the hosts based on a respective network complexity weight corresponding to each host. Additionally, the container scheduler dispatches a third container to a second host based on the resource availability and network complexity weight corresponding to the second host.

20 Claims, 5 Drawing Sheets

(56) References Cited

OTHER PUBLICATIONS

Proposal: Native Docker Multi-Host Networking #8951, dated Nov. 4, 2014 (49 pages) Link: https://github.com/docker/docker/issues/8951.

Jeong et al., (Abstract for article entitled) Self-configuring Software-defined Overlay Bypass for Seamless Inter- and Intra-cloud Virtual Networking, University of Florida, published May 31, 2016 (2 pages).

Kubernetes Master Tier for 1000 Nodes Scale, OpenStack Foundation, dated 2016 (19 pages) Link: http://fuel-ccp.readthedocs.io/en/latest/design/k8s_1000_nodes_architecture.html.

* cited by examiner

REDUCING OVERLAY NETWORK OVERHEAD ACROSS CONTAINER HOSTS

BACKGROUND

Computer systems may run applications or services that are provided via a server or cloud. The applications or services can be developed and deployed as a single unit or as multiple units, such as a collection of microservices. Applications or microservices may run within containers, which may be run on physical or virtual machines. For example, containers may encapsulate a lightweight runtime environment for an application or a microservice. In microservice architectures, containers are replicated across node clusters and network traffic between containers is transferred through and between overlay networks to enable multi-host networking environments. The overlay networks are orchestrated by container orchestrators and provide layers of network abstraction that can be used to run multiple separate, discrete virtualized network layers on top of a physical network. The overlay networks often provide additional security benefits.

SUMMARY

The present disclosure provides new and innovative systems and methods for reducing overlay network overhead across container hosts. In an example, a system includes a memory, a processor in communication with the memory, a first container and a second container running on a first host, and a container scheduler executing on the processor. Each of the first container and second container expose at least one network service port. The container scheduler executes on the processor to assign a network complexity weight to the first host. The network complexity weight is based on a quantity of network service ports that the first container and the second container expose. The container scheduler also filters a plurality of hosts based on resource availability corresponding to each host of the plurality of hosts and ranks the plurality of hosts based on a respective network complexity weight corresponding to each host of the plurality of hosts. Additionally, the container scheduler dispatches a third container to a second host of the plurality of hosts based on the resource availability and network complexity weight corresponding to the second host.

In an example, a method includes exposing, by each of a first container and a second container, at least one network service port. The first container and second container are running on a first host. A container scheduler assigns a network complexity weight to the first host. The network complexity weight is based on a quantity of network service ports that the first container and the second container expose. The container scheduler filters a plurality of hosts based on resource availability corresponding to each host of the plurality of hosts and ranks the plurality of hosts based on a respective network complexity weight corresponding to each host of the plurality of hosts. Then, the container scheduler dispatches a third container to a second host of the plurality of hosts based on the resource availability and the network complexity weight corresponding to the second host.

In an example, non-transitory machine readable medium stores code, which when executed by a processor, causes a container scheduler to assign a network complexity weight to a first host. The network complexity weight is based on a quantity of network service ports that a first container and a second container running on the first host expose. The container scheduler filters a plurality of hosts based on resource availability corresponding to each host of the plurality of hosts and ranks the plurality of hosts based on a respective network complexity weight corresponding to each host of the plurality of hosts. Then, the container scheduler dispatches a third container to a second host of the plurality of hosts based on the resource availability and the network complexity weight corresponding to the second host.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for reducing overlay network overhead across container hosts. Containers and/or pods may be added to a computer system to provide additional application functionality or to scale certain services or aspects of an application. For example, as processes are scaled to meet increased demand from clients, containers are replicated across node clusters and deployed to handle the increased load. These containers communicate via overlay networks (e.g., network traffic between containers is transferred through and between overlay networks) that are dynamically orchestrated by container orchestrators (e.g., Kubernetes, Docker swarm, Marathon, Azure, and Mesos). The overlay networks incur network latencies and bandwidth degradation as the collective number of rules associated with the overlay network(s) increases. As more overlay networks are created on individual hosts, additional processing resources are used on tasks corresponding to overlay network rules. Additionally, rule sets may not be compatible with each other and entire rule sets may need to be refreshed when overlay network rules are updated or changed. For example, network overlay rules may need to be updated or changed when new containers and/or rules are added to different hosts on the multi-host networking environment. If a container needs to be removed, network overlay rules need to be removed from their corresponding IP tables. Network overlay rules may specify how a network (e.g., network address 10.0.1) will communicate with a different network (e.g., network address 12.2.1) and the network overlay rules may specify routing instructions for packets sent between the networks. For example, network overlay rules may indicate whether a packet should be forwarded, modified, dropped, etc.

Due to the various container architectures and overlay networks (e.g., Flannel, Contiv, openVswitch, Nuage, IPtables), and large quantity of containers shared across platforms, network overlay rules may be frequently updated. For example, pods and/or containers may be created every few milliseconds, and a single host may have approximately 10 pods or approximately 100 containers running on each host every second. Each time a new container is provided on the host, additional network overlay rules may be added or updated, which may result in approximately 10 to 100 rule updates per second on the host. As more and more containers are implemented on different hosts, more overlay networks are created to ensure that containers on each host communicate and function properly in the multi-host networking environment.

However, since the container scheduler and orchestrator operate at a higher level than where the overlay networks are created, the orchestrator and schedulers do not typically know how many overlay networks currently exist in a system or how many network overlay rules are created on each host. In some cases, a container host may become overwhelmed with frequent overlay rule updates, leaving little CPU resources for containers to run their applications. For example, systems may include thousands of nodes and thousands of containers, which may result in the vast majority (e.g., 90 percent or more) of the CPU being used to update network overlay rules across each container.

To reduce the complexity of overlay network rules, a new layer of constraint may be added during container scheduling to increase the tenant per host density or pod per host density, thereby reducing the necessity to create overlay networks and advantageously diminishing processing resources used on tasks corresponding to overlay rules such as rule updating and packet forwarding. Typically, one pod belongs to a single tenant, which may have one or more pods. For example, by maximizing the tenant per host density or pod per host density, less hosts are used and less overlay networks are needed in the multi-host networking environment, thereby reducing the amount of network overlay rules. The container scheduler may apply an overlay network complexity weight to each host to increase the tenant or pod per host density. For example, the container scheduler may use the network service ports that containers request and expose as a proxy to the complexity of the overlay networks on the host. For example, each container host may be assigned an overlay network complexity weight (NCW) based on the number of network service ports requested by the tenant or pod running on the host. Then, when the orchestrator chooses which hosts the newly created containers are dispatched to, the scheduler(s) filter hosts based on resource (e.g., CPU, RAM) availability. The scheduler(s) also rank hosts based on their overlay NCW and choose hosts with the least amount of complexity thereby avoiding adding containers to overly complex hosts and advantageously reducing resources used to update overlay network rules. Once a host is chosen and the container is added to the host, the overlay NCW of the hosts are updated such that the orchestrator can properly place additional containers to increase the tenant per host or pod per host density and advantageously reduce the necessity to create additional overlay networks and the resources associated with updating rules associated with those networks.

Figure 1:
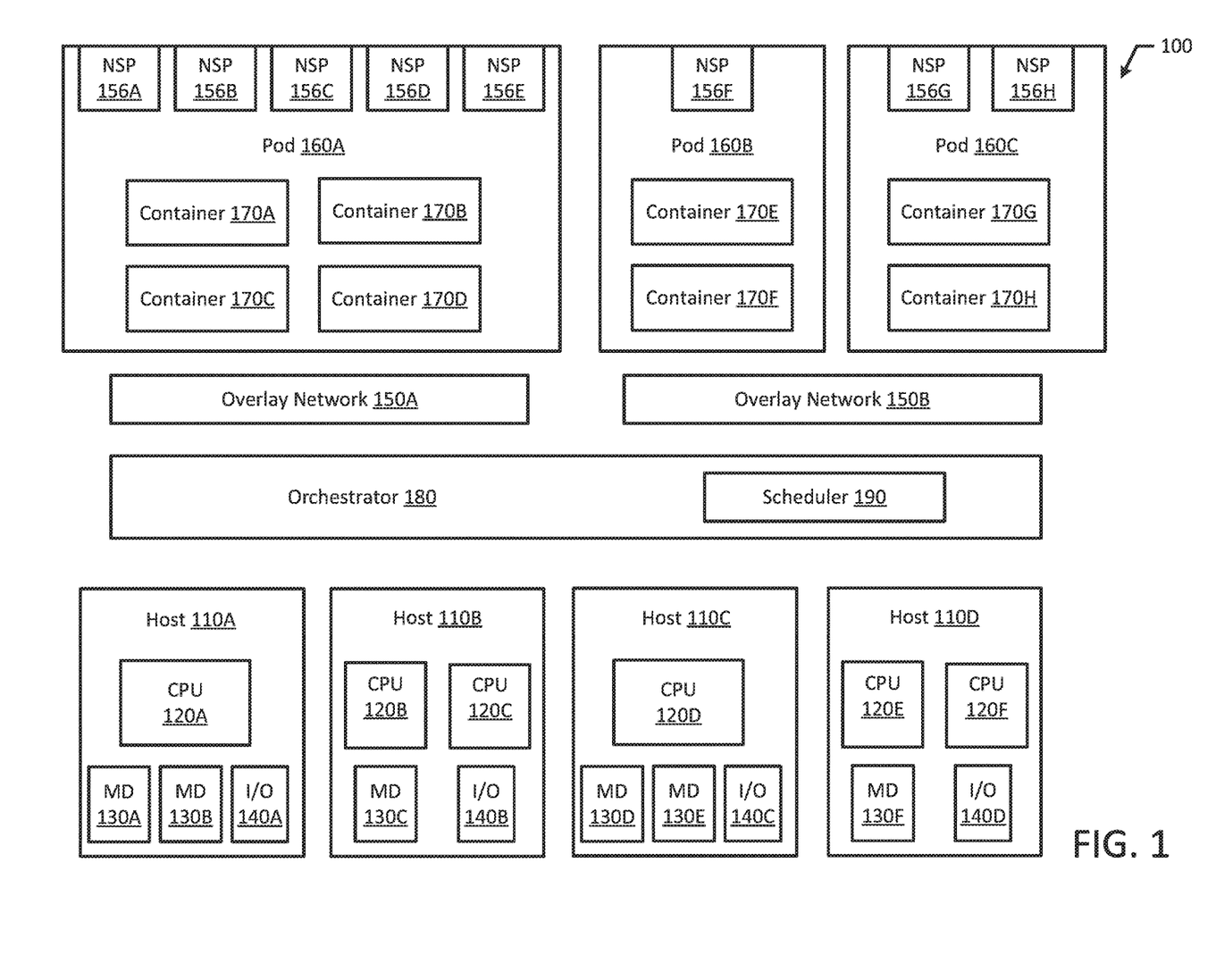
FIG. 1 illustrates a block diagram of an example container system according to an example embodiment of the present disclosure.

FIG. 1 depicts a high-level component diagram of an example container system 100 in accordance with one or more aspects of the present disclosure. The container system 100 may include an orchestrator 180 and a scheduler 190 that implement pods 160A-C and/or containers 170A-H on various overlay networks 150A-B.

Pods 160A-C may each include one or more containers 170A-H. For example, containers 170A-D may be treated as a single unit of deployment in pod 160A. Similarly, containers 170E-F may be organized in pod 160B and containers 170G-H may be organized in pod 160C. In an example, containers 170A-H may be organized in pods 160A-C and may be co-located on the same host (e.g., host 110A) and share the same resources. For example, Pod 160A and associated containers 170A-D may be located on host 110A and share the same resources, network, memory, and storage of the host 110A (e.g., CPU120A, memory devices 130A-B, and input/output device(s) 140A). Similarly, pod 160B may be associated with containers 170E-F and may be located on host 110B (containers 170E-F may share the same resources e.g., CPU120B-C, memory device(s) 130C, and input/output device(s) 140B). In an example, multiple pods (e.g., pod 160B-C) may be located on the same host (e.g., host 110B). In another example, each pod 160A-C may be located on its own host 110A-D.

In an example, each container (e.g., container 170A-D) running within the same pod (e.g., pod 160A) may be associated with the same hostname so that the containers 170A-D can be addressed as a unit. Additionally, each pod 160A-C may have a dedicated IP address that is shared by all the containers belonging to each pod respectively.

Containers 170A-H may execute applications or services, such as microservices. In an example, the containers 170A-H may each run a process or service and the containers 170A-H may be any execution environment. For example, the containers 170A-H may be a server, such as a virtual server. It should be appreciated that the containers 170A-H may be stand alone execution environments, similar to that of a virtual machine. For example, containers 170A-H may not be grouped or organized by tenants or into pods 160.

Network Service Ports 156A-H, hereinafter network service ports (NSP) 156, may be exposed by containers (e.g., container 170A-H, which may hereinafter be generally referred to as container 170) to allow network traffic between containers 170 and/or pods 160. A container 170 and/or pod 160 may expose a single network service port 156. In another example, a container 170 and/or pod 160 may expose a range of network service ports 156. For example, container 170A may expose NSP156A-E. Similarly, container 170E and/or pod may expose NSP 156F. In an example, each container 170G and 170H associated with a pod 160C may expose the same NSPs 156G-H.

Overlay Network 150A-B, hereinafter overlay networks 150, may be created to enable communication between containers 170 and/or pods 160, hosts 110, and network devices in a multi-host networking environment. Additionally, overlay networks 150 may be available to nodes that require the overlay network 150 for service. When a service or container 170 is created that uses an overlay network 150, this overlay network 150 may be extended to the nodes or hosts 110 that run that service or container 170, which may require overlay network rules to be added or updated.

The orchestrator 180 may coordinate the deployment of containers 170A-H. In an example, the orchestrator 180 may be a server. Additionally, the orchestrator 180 may be equipped with scheduler 190. In an example, the scheduler 190 may be an add-on scheduler. The orchestrator 180 may determine the timing of container creation. For example, the orchestrator 180 may dictate the order of container creation based on an order of dependencies. Additionally, orchestrator 180 may coordinate container configuration to enable containers 170 to communicate with one another. For example, orchestrator 180 may pass runtime properties between containers 170.

Scheduler 190 may assign overlay network complexity weights to hosts 110 based on the quantity of NSPs 156 that the containers 170 in each host 110 expose. The scheduler 190 may filter and rank hosts 110 based on resource availability and the overlay NCW of each host 110. Additionally, scheduler 190 may dispatch containers 170 coordinated by orchestrator 180 on hosts 110 according to the filtering and ranking of hosts 110. Scheduler 190 may be a monolithic scheduler that handles all scheduling requests, a two-level scheduler that adjusts allocation of resources to each scheduler dynamically, or a shared-state scheduler. A shared-state scheduler may have multiple scheduling components with full access to the entire cluster of resources. In an example, scheduler 190 may be a cluster scheduler that uses placement constraints and schedules applications. Additionally, scheduler 190 may schedule applications rapidly to avoid applications or containers 170 from sitting in a pending state.

Each host 110A-D may in turn include one or more physical processors (e.g., CPU 120A-F) communicatively coupled to memory devices (e.g., MD 130A-F) and input/output devices (e.g., I/O 140A-D). As used herein, physical processor or processor 120A-F refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-F refers to a volatile or non-volatile memory device, such as RAM, ROM, EEPROM, or any other device capable of storing data. As discussed herein, I/O device 140A-D refers to a device capable of providing an interface between one or more processor pins and an external device capable of inputting and/or outputting binary data.

Processors 120A-F may be interconnected using a variety of techniques, ranging from a point-to-point processor interconnect, to a system area network, such as an Ethernet-based network. Local connections within each node, including the connections between a processor 120A-F and a memory device 130A-F may be provided by one or more local buses of suitable architecture, for example, peripheral component interconnect (PCI).

Figure 2:
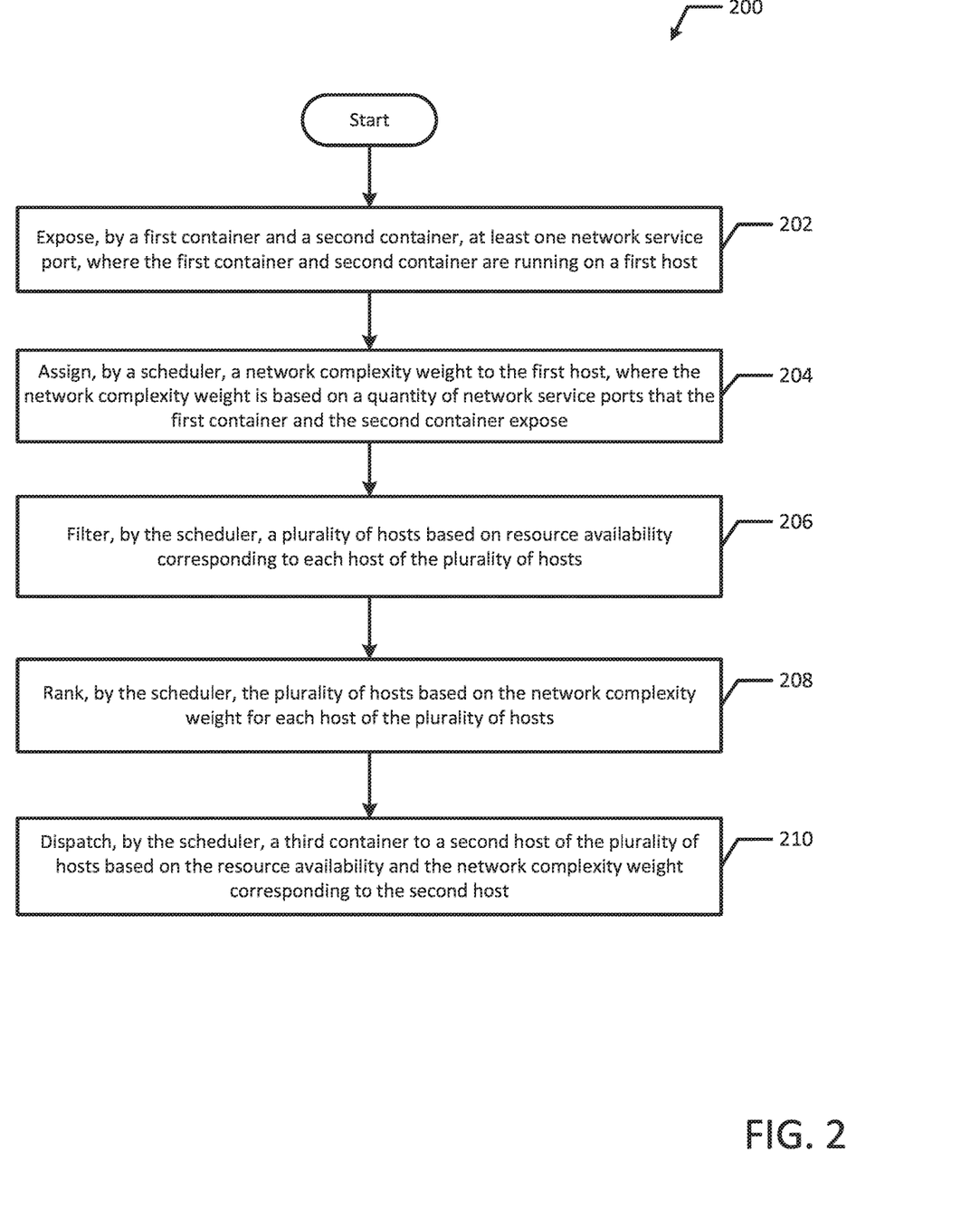
FIG. 2 illustrates a flowchart of an example process for reducing overlay network overhead across container hosts according to an example embodiment of the present disclosure.

FIG. 2 illustrates a flowchart of an example method 200 for reducing overlay network overhead across containers hosts in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 includes a first container and a second container exposing at least one network service port, where the first container and second container are running on a first host (block 202). For example, a container (170G and a container 170H may expose network service ports NSP 156G and NSP 156H. The network service ports enable communication (e.g., network traffic) between containers 170 or between containers 170 and other network components (e.g., network devices). Then, a scheduler assigns a network complexity weight to the first host, where the network complexity weight is based on a quantity of network service ports that the first container and the second container expose (block 204). For example, the scheduler 190 may assign an overlay network complexity weight, such as the sum of total quantity of network service ports that the container 170G and the container 170H expose, to host 110C. If containers 170G and 170H expose network service ports 156G and 156H, the host 110C may be assigned an overlay NCW of "2" or the total quantity of network service ports (e.g., NSP 156G and NSP 156H) exposed by containers 170G and 170H. In another example, the network complexity weight may be the inverse of the total quantity of network service ports 156, such as "½".

In various other embodiments, the overlay network complexity weight may depend on which network service ports are exposed by the containers 170. For example, a network service port (e.g., port_80) that typically receives more network traffic may be weighted differently than other network service ports 156. Additionally, overlay network complexity weight may depend on the quantity of overlay networks associated with a host. The overlay network complexity weight may be based on one or more of the following and/or any combination of weight factors, quantity of network service ports 156 exposed, quantity of overlay networks 150, address of network service port 156 (e.g., port_80), etc.

Then, the scheduler filters a plurality of hosts based on resource availability corresponding to each host of the plurality of hosts (block 206). For example, the scheduler 190 may filter hosts 110A-D based their corresponding resource availability. In an example, resource availability may include a processor availability metric and/or a memory availability metric. The processor availability metric my represent available CPU, such as $200m$ (e.g., two hundred millicpu or two hundred millicores). The memory availability metric may represent available memory, such as 256 MB, 2 GB, etc. In an example, the memory availability metric may include a random access memory availability metric that represents the available random access memory on the host 110. Additionally, scheduler 190 may eliminate hosts 110 that do not currently have a container 170 running on them, thereby advantageously preventing starting a new container on a new host, which may introduce an additional overlay network instead of increasing the container 170 or pod per host density.

The scheduler ranks the plurality of hosts based on the network complexity weight for each host of the plurality of hosts (block 208). For example, the scheduler 190 may rank the remaining hosts 110A-D based on the overlay network complexity weight corresponding to each host 110A-D. As discussed above, the overlay network complexity weight may be based on one or more of the following and/or any combination of weight factors, quantity of network service ports 156 exposed, quantity of overlay networks 150, address of network service port 156 (e.g., port_80), etc. Next, the scheduler dispatches a third container to a second host of the plurality of hosts based on the resource availability and the network complexity weight corresponding to the second host (block 210). For example, the scheduler 190 may dispatch a container 170F to a host 110C based on the resource availability and the overlay network complexity weight corresponding to host 110C relative to the resource availability and overlay network complexity weight corresponding to hosts 110A-D. By adding containers 170 to hosts 110 based on overlay NCW and resource availability, the scheduler 190 advantageously ensures that the host 110 is suitable for the new container 170 (e.g., has appropriate resources to run the container) and also increases container density per host, which reduces overly burdensome and complex network overlay rules or the creation of additional overlay networks.

Figure 3A:
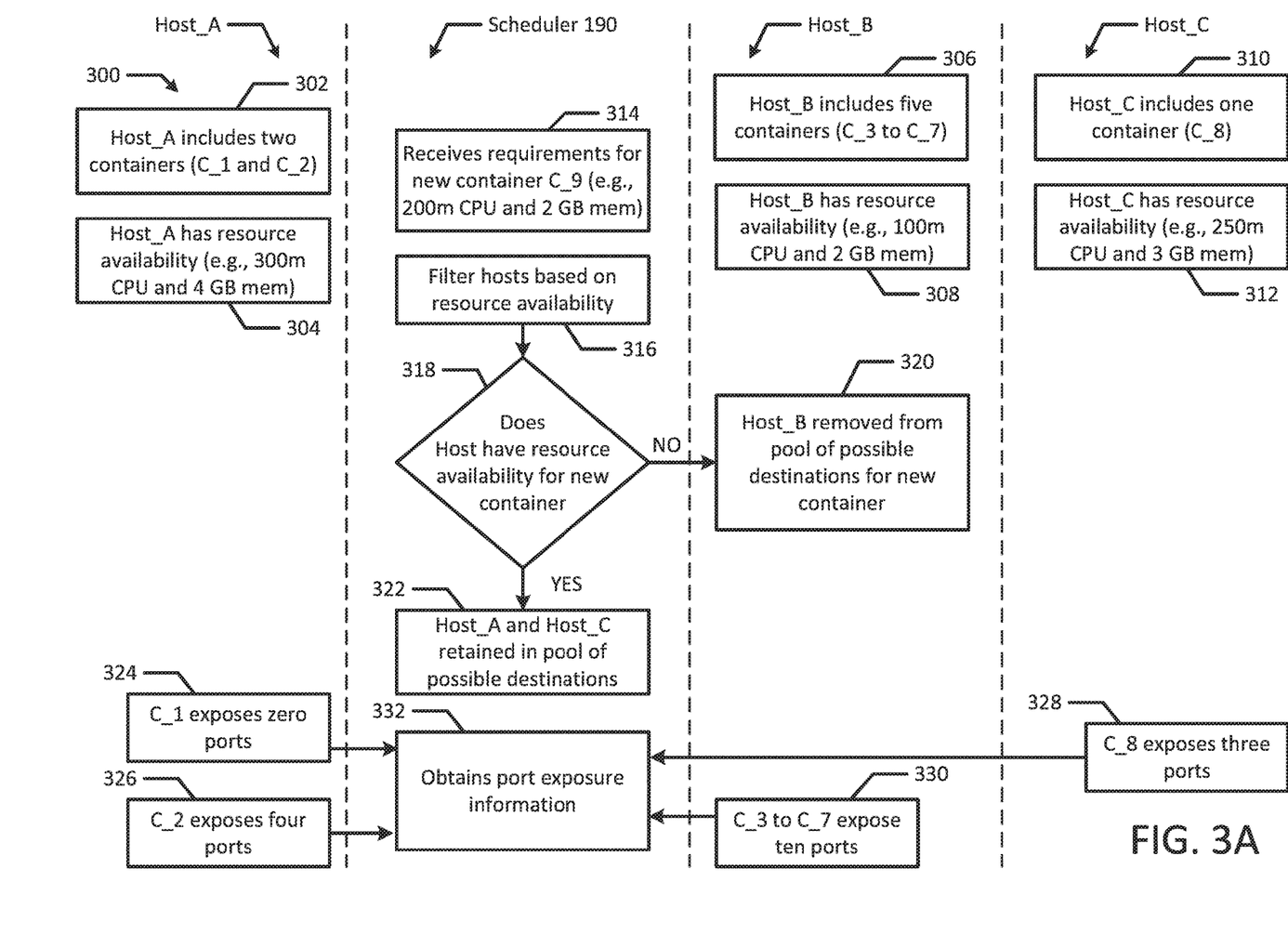
FIGS. 3A and 3B illustrate a flow diagram of an example process for reducing overlay network overhead across container hosts according to an example embodiment of the present disclosure.
Figure 3B:
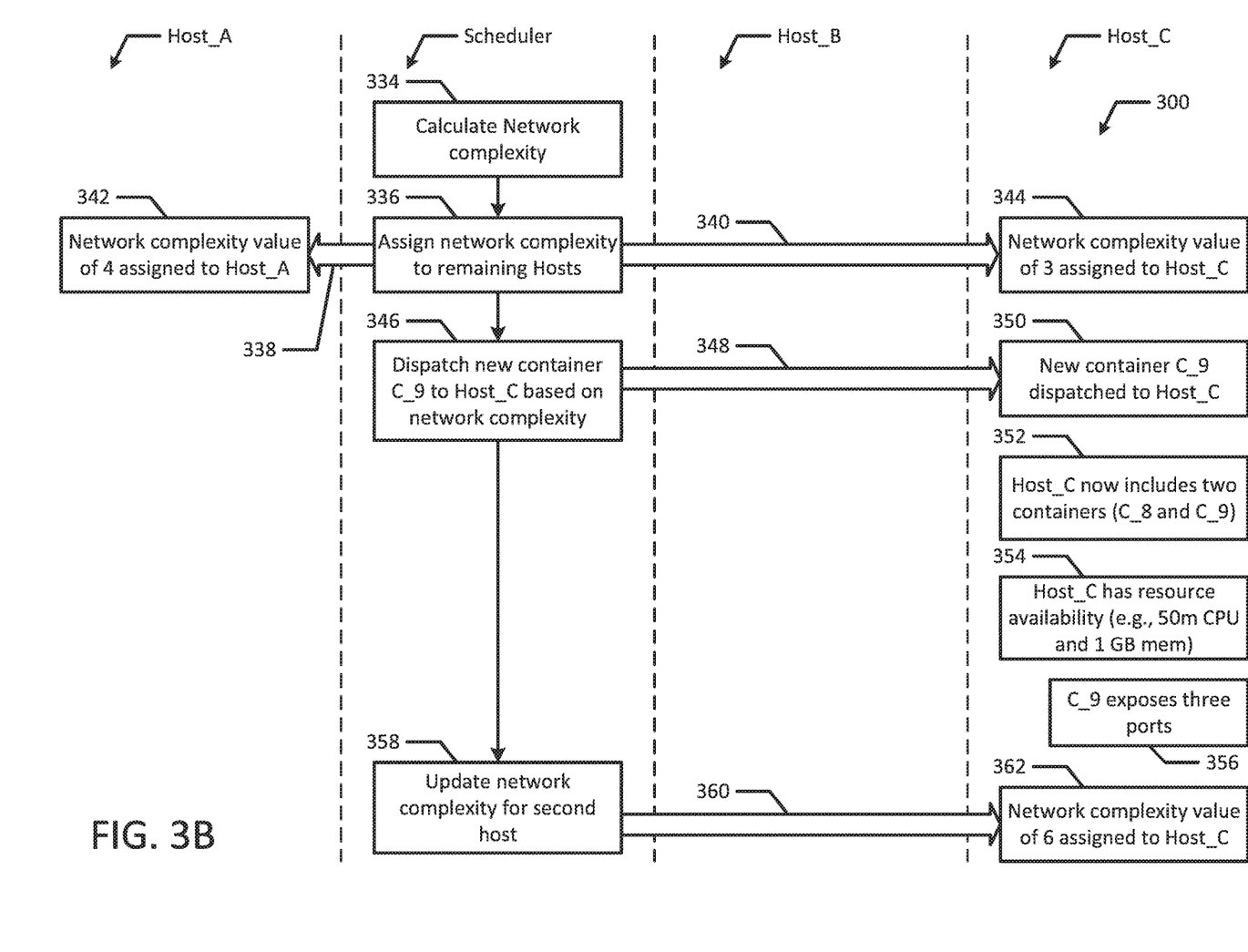

FIGS. 3A and 3B illustrate a flowchart of an example method 300 for reducing overlay network overhead across container hosts. Although the example method 300 is described with reference to the flowcharts illustrated in FIGS. 3A and 3B, it will be appreciated that many other methods of performing the acts associated with the method 300 may be used. For example, the order of some of the blocks may be changed, certain blocks may be combined with other blocks, and some of the blocks described are optional. The method 300 may be performed by various hosts 110 (e.g., Host_A, Host_B, and Host_C), containers 170 (e.g., container C_1 to C_9), and a scheduler 190 may communicate to perform example method 300.

In the illustrated example, host_A includes two containers (e.g., container C_1 and container C_2) (block 302). For example, orchestrator 180 may coordinate containers C_1 and C_2 to be deployed on host_A. Additionally, host_A has resource availability of 300$m$ CPU and 4 GB memory (block 304). For example, host_A may have 300 m CPU and 4 GB memory available for additional containers 170 after taking into account the resource consumption of both containers C_1 and C_2. Host_B includes five containers (e.g., container C_3 to container C_7) and has resource availability of 100$m$ CPU and 2 GB of memory (blocks 306 and 308). For example, orchestrator 180 may coordinate containers C_3 to C_7 to be deployed on host_B in a multi-host networking environment. For example, containers C_3 to C_7 may be co-located on the same host (e.g. host_B) because the containers 170 may and share the same resources (e.g., CPU, memory devices, and input/output devices) and therefore may run more efficiently on host_B. Each container C_3 to C_7 may have been started on host_B at different times. Conversely, containers C_3 to C_7 may have been started on host_B at approximately the same time. Similarly, host_C includes one container (e.g., container C_8) and has resource availability of 250$m$ CPU and 3 GB of memory (blocks 310 and 312). For example, host_B may have 100 m CPU and 2 GB of memory available to support additional containers 170 after taking into account the resource consumption of containers C_3 to C_7.

Due to increased need for a specific service, a container 170 may be replicated or additional containers 170 may be added to scale the application. The orchestrator 180 may coordinate deployment of additional containers 170 with scheduler 190 to meet the increased need. The scheduler 190 receives requirements for a new container C_9 (block 314). For example, scheduler 190 may receive requirements for the newly created container C_9 from orchestrator 180. The new container C_9 may require 200 m CPU and 2 GB of memory.

Then, the scheduler filters hosts based on resource availability (block 316). For example, scheduler 190 may filter hosts 110 based on available memory and CPU. Additionally, as discussed above, the scheduler 190 may remove hosts that are not currently running any containers 170 (e.g., a dormant host_D).

The scheduler may determine whether each host has enough available resources for the new container C_9 (block 318). In an example, the scheduler 190 may remove hosts 110 from the pool of potential container destinations if the container does not have sufficient resources available for the container. For example, scheduler 190 may remove host_B for lacking the required resources. In another example, the scheduler 190 may remove hosts 110 from the pool of potential container destinations if the container does not have the required resources plus an additional buffer amount of resources. For example, if the new container C_9 requires 200 m CPU and 2 GB of memory, a buffer, such as 50 m CPU and 0.1 GB of memory may be used to ensure that the destination has appropriate resources. For example, scheduler 190 may have out of date resource availability information and the buffer may reduce the likelihood of scheduling a container 170 to an incompatible host 110.

Based on scheduler 190 determining that host_B does not have the requisite resources for the new container, scheduler 190 removes host_B from the pool of possible destinations for the new container (block 320). For example, new container C_9 requires 200 m CPU and 2 GB of memory, and host_B has 100 m CPU and 2 GB of memory available. Thus, host_B does not have enough CPU for container C_9 (e.g., host_B lacks 100 m CPU), and is removed as a possible destination for container C_9. Additionally, the scheduler 190 may determine that host_A and host_C have enough resources available for the new container C_9. For example, host_A has 300 m CPU and 4 GB of available memory while host_C has 250 m CPU and 3 GB of available memory, both of which exceed the requirements of 200 m CPU and 2 GB memory of container C_9. Host_A and host_C are retained in the pool of possible destinations for the new container C_9 (block 322). Since host_A and host_C have the appropriate resources for the new container C_9, host_A and host_C are retained in the pool of possible destinations for the new container C_9. As discussed above, hosts 110 without a container 170 may also be eliminated to ensure that container per host density is increased. Additionally, if a buffer is used, a host 110 may be eliminated if it does not have the requisite resources (e.g., container resources plus additional buffer resources) to reduce the likelihood of scheduling a container on an inadequate host. For example, in multi-host networking environments, containers 170 may be started and stopped rapidly, and the resource availability on each host 110 may be dynamically changing and outdated.

The containers 170 may expose various network service ports 156. For example, any number of NSPs 156 may be exposed to enable communication (e.g., network traffic) to and from containers 170, hosts 110, and/or network devices. Container C_1 exposes zero ports (block 324). For example, container C_1 may not expose any network service ports 156 at this time, perhaps because container C_1 does not have a need to establish a link or communication with other containers 170 or network devices outside of its own pod. Additionally, container C_2 exposes four ports (block 326). For example, container C_2 may expose network service ports 156 (e.g., port_35, port_36, port_37, and port_90). Container C_8 on host_C exposes three ports (block 328). For example, container C_8 may expose network service ports 156 (e.g., port_80, port_23, port_40, and port 56). Additionally, containers C_3 to C_7 expose ten ports (block 330). For example, containers C_3 to C_7 may expose ten NSPs 156 (e.g., port_20, port_22, port_37, port_38, port_44, port_50, port_55, port_58, port_80, and port_90), some of which may be the same ports 156 exposed by containers C_2 and C_8. For example, containers 170 exposing the same NSPs 156 may be communicating with other containers 170, hosts 110, and/or network devices associated with those same NSPs 156 (e.g., port_37, port_80, and port_90). Then, the scheduler 190 obtains port exposure information (block 332). For example, scheduler 190 may poll containers 170 to obtain port exposure information. In another example, containers 170 may report exposure information to scheduler 190.

The scheduler 190 calculates network complexity (block 334). For example, scheduler 190 may calculate overlay network complexity based on the number of ports exposed by each container 170, such that the overlay network complexity for host_A is the sum of the quantity of the network service ports 156 exposed by C_1 (e.g., zero ports) and the network service ports exposed by C_2 (e.g., four ports), resulting in an overlay NCW of "4". Similarly, the scheduler 190 may calculate the overlay network complexity weight for host_C as an overlay NCW of "3" (e.g., total quantity of ports exposed by C_8 on host_C). Then, the scheduler assigns network complexity to the remaining hosts (blocks 336, 338, and 340). Additionally, the scheduler 190 may assign an overlay NCW of "10" to host_B so that it is available for future container placement decisions. An overlay network complexity value of "4" is assigned to host_A (block 342). In another example, overlay network complexity values may depend on other factors, such as a scaling factor applied to each port 156 based on traffic and CPU expenses associated with those ports 156 (e.g., port_80 may have more overhead and may typically be more CPU expensive due to increased traffic through the network service port 156 and thus may receive a larger weight or scaling factor). Additionally, overlay network complexity may be based on the type of overlay network associated with the host 110. For example, some overlay networks may be more efficient than others. In another example, overlay network complexity may take into consideration the number of overlay networks on the host 110. Similarly, an overlay network complexity value of "3" is assigned to host_C (block 344). For example, scheduler 190 may store overlay network complexity values in memory or in a database. In another example, scheduler 190 may assign overlay network complexity values by updating metadata associated with the containers 170 and/or host 110.

Then, the scheduler 190 dispatches the new container C_9 to host_C based on network complexity (blocks 346 and 348). For example, of the remaining two potential destinations for container C_9, host_C has the lowest or in this case, most favorable overlay network complexity. It should be appreciated that other methods of determining the overlay network complexity may be used, such that a lower value of overlay network complexity may indicate a more complex and thus less favorable container destination. Then, new container C_9 is dispatched to host_C (block 350). For example, container C_9 is dispatched on host_C to run alongside container C_8 thereby advantageously increasing container or pod per host density and preventing overly cumbersome network overlay rule updates on hosts with more complex networks After container C_9 is dispatched to host_C, host_C now includes two containers (e.g., containers C_8 and C_9) (block 352). In an example, each container C_8 and C_9 may be part of the same tenant or pod 160. Additionally, host_C has an updated resource availability (block 354). For example, host_C now has 50 m CPU and 1 GB memory of available resources. Container C_9 may expose three ports (block 356). After container C_9 is started on host_C, the container 170 may expose network service ports 156 to enable the container 170 to communicate with other containers 170, hosts 110, and/or network devices. In another example, the container 170 may expose the same network service ports 156 that are associated with a pod 160. Then, the scheduler may update the network complexity for the second host (blocks 358 and 360). For example, after new containers 170 (e.g., container C_9) are started on hosts 110 and the containers 170 expose network service ports, the scheduler 190 may update the overlay network complexity for each of the hosts 110 with newly added containers 170. Then, a network complexity value of "6" is assigned to host_C (block 362). For example, since container C_8 exposed three ports 156 and container C_9 exposed three ports 156, the overlay network complexity value assigned to host_C may be updated from an overlay NCW of "3" to an overlay NCW of "6" to represent the additional three ports exposed by container C_9. As overlay NCWs are updated, future container placement decisions may be made more quickly and efficiently as many or all of the overlay NCW computations have been pre-determined.

Figure 4:
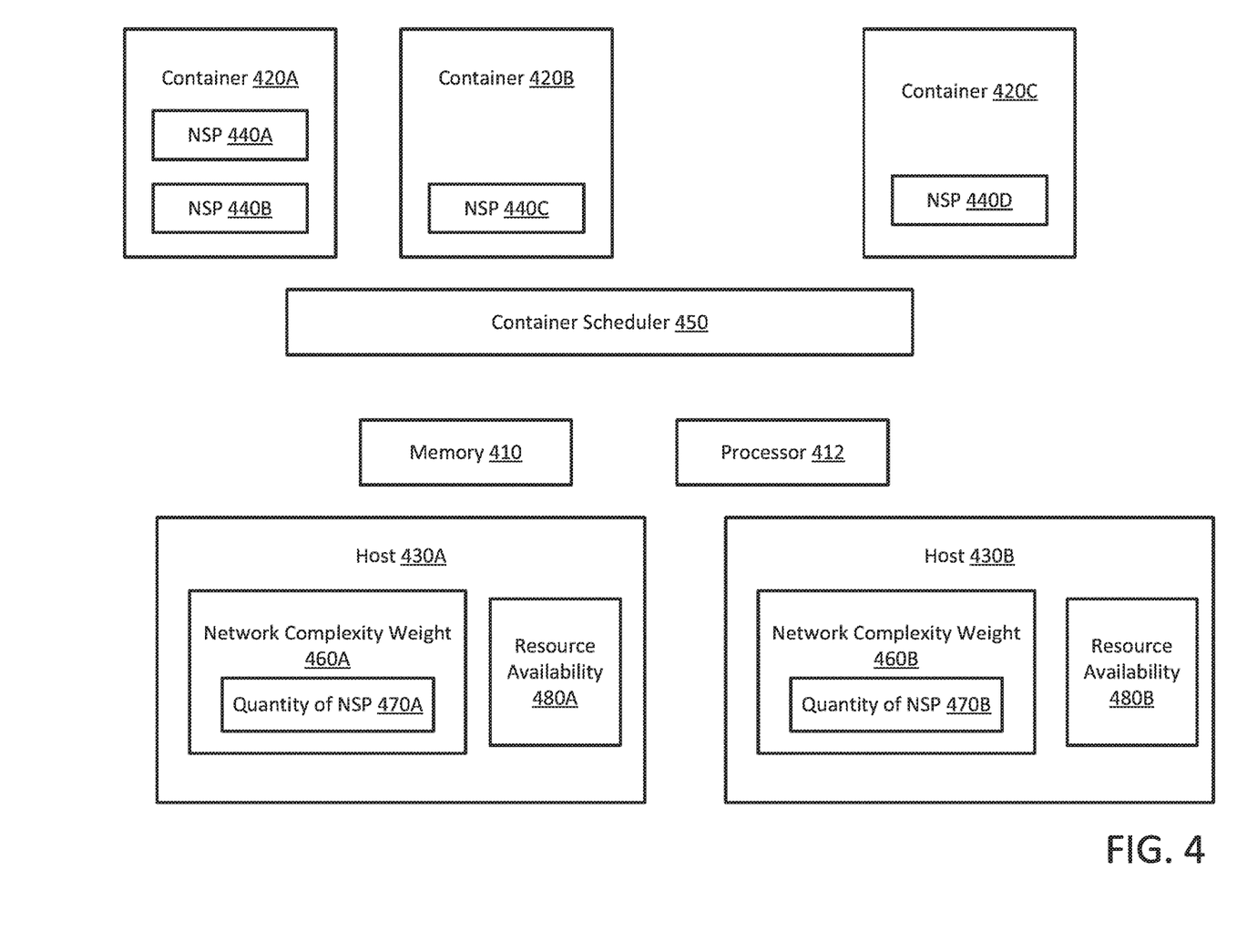
FIG. 4 illustrates a block diagram of an example container system for reducing overlay network overhead across container hosts according to an example embodiment of the present disclosure.

FIG. 4 is a block diagram of an example automatic system 400 for reducing overlay network overhead across container hosts according to an example embodiment of the present disclosure. The system 400 for reducing overlay network overhead across container hosts may include a memory 410, a processor 420 in communication with the memory 510, a first container 420 and a second container 422 running on a first host 430A, and a container scheduler 450 executing on the processor 420. The first container 420 and the second container 422 may expose at least one network service port 440A-B. The container scheduler 450 executes on the processor 412 to assign a network complexity weight 460A to the first host 430A. The network complexity weight 460A is based on a quantity 470A-B of network service ports 440A-B that the first container 420 and the second container 422 expose. The container scheduler 450 may filter a plurality of hosts 430A-C based on resource availability 480 corresponding to each host (e.g., host 430A, host 430B, and host 430C) of the plurality of hosts 430A-C and may rank the plurality of hosts 430A-C based on a respective network complexity weight 460A-C corresponding to each host of the plurality of hosts 430A-C. Then, the container scheduler 450 may dispatch a third container 424 to a second host 430B of the plurality of hots 430A-C based on the resource availability 480B and network complexity weight 460B corresponding to the second host 430B.

The systems and methods disclosed herein are inextricably tied to and provide an improvement to computer technology. For example, by adding an additional layer of constraint during container scheduling (e.g., determining an assigning overlay network complexity weight to hosts 110 and filtering hosts 110 based on their resource availability and overlay NCW), the complexity of overlay network rules is reduced and the tenant per host 110 density or pod 160 per host 110 density is increased, thereby reducing the necessity to create overlay networks 150 and advantageously diminishing processing resources used on tasks corresponding to overlay rules. The solution described herein is necessarily rooted in computer technology to overcome a problem specifically arising in the realm of computer networks, and more specifically to cloud computing, by addressing the challenge of scheduling containers 170 in a multi-host networking environment. For example, the scheduler 190 assigns overlay network complexity weights to hosts 110, filters hosts 110 based on resource availability, ranks hosts 110 based on their respective overlay network complexity weight, and dispatches containers 170 to hosts 110 based on the resource availability and overlay network complexity weight corresponding to each host 110, thereby providing a particular way to address a problem and improve upon the existing technological processes for scheduling containers in cloud environments, which results in reducing the overhead associated with processing overlay rules from the disclosed unconventional manner of scheduling containers. The disclosed systems and methods improve the computer hardware on which the containers 170 and overlay network 150 exist to allow for a performance of hardware utilization not previously performable.

The scheduler 190 offers the benefit of filtering/ranking hosts 110 based on both resource availability and complexity, such as overlay network complexity weight, which is a technology-based solution that overcomes the disadvantages of scheduling containers 170 according to generic and conventional methods. The scheduler 190 executing on a processor (e.g., CPU 120) acts in concert with containers 170 and hosts 110 to provide a non-conventional and non-generic arrangement that improve existing container scheduling techniques to reduce the quantity of overlay networks, and thus reduce the amount of overlay network rule updates thereby increasing the utilization rate of physical processors for running container applications and reducing overhead.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   exposing, by each of a first container and a second container, at least one network service port, wherein the first container and second container are running on a first host;
   assigning, by a container scheduler, a network complexity weight to the first host, wherein the network complexity weight is based on a quantity of network service ports that the first container and the second container expose;
   filtering, by the container scheduler, a plurality of hosts based on resource availability corresponding to each host of the plurality of hosts;
   ranking, by the container scheduler, the plurality of hosts based on a respective network complexity weight corresponding to each host of the plurality of hosts; and
   dispatching, by the container scheduler, a third container to a second host of the plurality of hosts based on the resource availability and the network complexity weight corresponding to the second host.

2. The method of claim 1, wherein resource availability includes at least one of a processor availability metric and a memory availability metric.

3. The method of claim 2, wherein the memory availability metric is a random-access memory availability metric.

4. The method of claim 1, wherein the first host and the second host are on different physical processors.

5. The method of claim 1, wherein the network complexity weight is further based on which network service ports are exposed by the first container and second container.

6. The method of claim 1, wherein the container scheduler updates the network complexity weight corresponding to the second host after the third container is dispatched to the second host.

7. The method of claim 1, further comprising starting, by an orchestrator, the third container.

8. The method of claim 1, further comprising determining, by the container scheduler, the network complexity weight of the first host.

9. A system comprising:
   a memory;
   at least one processor in communication with the memory;
   a first container and a second container running on a first host, wherein each of the first container and second container expose at least one network service port; and
   a container scheduler executing on the at least one processor, wherein the container scheduler executes on the at least one processor to:
   assign a network complexity weight to the first host, wherein the network complexity weight is based on a quantity of network service ports that the first container and the second container expose,
   filter a plurality of hosts based on resource availability corresponding to each host of the plurality of hosts,
   rank the plurality of hosts based on a respective network complexity weight corresponding to each host of the plurality of hosts, and
   dispatch a third container to a second host of the plurality of hosts based on the resource availability and network complexity weight corresponding to the second host.

10. The system of claim 9, wherein the first host and the second host are on different physical processors.

11. The system of claim 9, wherein the network complexity weight is further based on which network service ports are exposed by the first container and second container.

12. The system of claim 9, wherein resource availability includes at least one of a processor availability metric and a memory availability metric.

13. The system of claim 9, wherein the memory availability metric is a random-access memory availability metric.

14. The system of claim 9, wherein the container scheduler updates the network complexity weight corresponding to the second host after the third container is dispatched to the second host.

15. The system of claim 9, further comprising an orchestrator, wherein the orchestrator starts the third container.

16. The system of claim 9, wherein the container scheduler executes on the at least one processor to determine the network complexity weight of the first host.

17. A non-transitory machine readable medium storing code, which when executed by at least one processor, causes a container scheduler to:
- assign a network complexity weight to a first host, wherein the network complexity weight is based on a quantity of network service ports that a first container and a second container running on the first host expose;
- filter a plurality of hosts based on resource availability corresponding to each host of the plurality of hosts;
- rank the plurality of hosts based on a respective network complexity weight corresponding to each host of the plurality of hosts; and
- dispatch a third container to a second host of the plurality of hosts based on the resource availability and the network complexity weight corresponding to the second host.

18. The non-transitory machine readable medium of claim 17, wherein the first host and the second host are on different physical processors.

19. The non-transitory machine readable medium of claim 17, wherein the network complexity weight is further based on which network service ports are exposed by the first container and second container.

20. The non-transitory machine readable medium of claim 17, wherein resource availability includes at least one of a processor availability metric and a memory availability metric.

* * * * *

UNITED STATES PATENT AND TRADEMARK OFFICE
CERTIFICATE OF CORRECTION

PATENT NO. : 10,705,881 B2  
APPLICATION NO. : 15/593744  
DATED : July 7, 2020  
INVENTOR(S) : Chen et al.

Page 1 of 1

It is certified that error appears in the above-identified patent and that said Letters Patent is hereby corrected as shown below:

In the Specification

In Column 9, Line 7, replace "port 56" with --port_56--.

In the Claims

In Column 12, Line 65 (Claim 13), replace "claim 9" with --claim 12--.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*